United States Patent
Wallshein

[11] 3,879,850
[45] Apr. 29, 1975

[54] ORTHODONTIC ELASTIC APPLIANCE
[76] Inventor: Melvin Wallshein, 8645 Bay Pky., Brooklyn, N.Y. 11214
[22] Filed: Nov. 29, 1972
[21] Appl. No.: 310,574

[52] U.S. Cl. .............................................. 32/14 A
[51] Int. Cl. ............................................ A61c 7/00
[58] Field of Search ...... 32/14 A, 14 B, 14 C, 14 D, 32/14 E, 30.5 P; 24/73 A, DIG. 4, 30.5 R; 267/16 PB

[56] References Cited
UNITED STATES PATENTS

| | | |
|---|---|---|
| 788,947 | 5/1905 | Roth .................................. 132/91 |
| 2,767,469 | 10/1956 | Gladstone ........................ 32/14 A |
| 3,174,787 | 3/1965 | Kolman ............................ 24/115 R |
| 3,530,583 | 9/1970 | Klein et al. ...................... 32/14 A |
| 3,593,421 | 7/1971 | Brader ............................. 32/14 A |

Primary Examiner—Robert Peshock
Attorney, Agent, or Firm—Flynn & Frishauf

[57] ABSTRACT

An orthodontic elastic appliance, for use with an orthodontic bracket which includes a channel, has a generally elongated member either in the form of a strand or a circular loop of elastic material. Protuberances in the form of nodules are provided along the length of the elongated member. The elastic nature of the member permits changes in the relative spacing between two or more nodules or a nodule and another projection projecting from the member. The external dimensions of the elastic elongated members are so selected so that they can pass through the channel of an orthodontic bracket while the nodules and other projections which protrude from the member have external dimensions greater than those of the members and so selected so that the nodules cannot pass through the channel. In this manner, a force applied to the elastic member to stretch the same on one side of a channel of the bracket with the nodule abutting against the bracket on the other side of the channel is transmitted by the nodule to the bracket. Other forms of protuberances from the elastic member include elastic wedges and hook-shaped members which cooperate with orthodontic brackets and which are adapted to engage arch wires.

13 Claims, 23 Drawing Figures

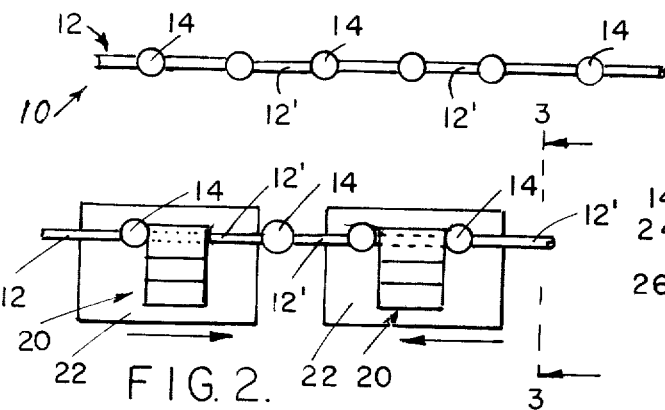
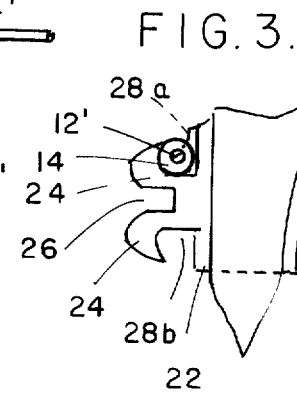
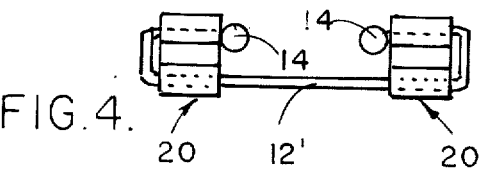
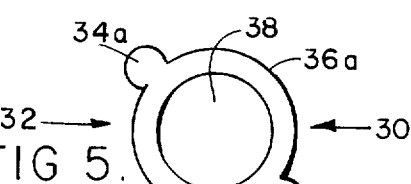
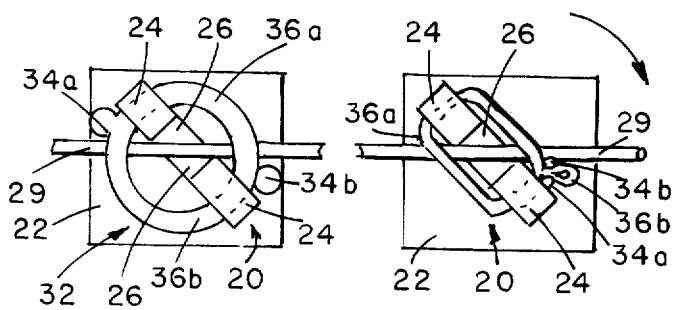
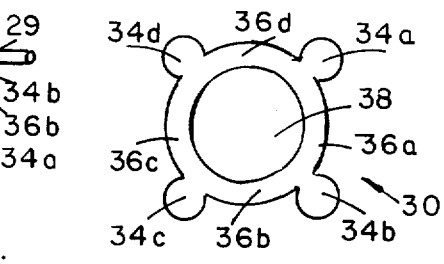
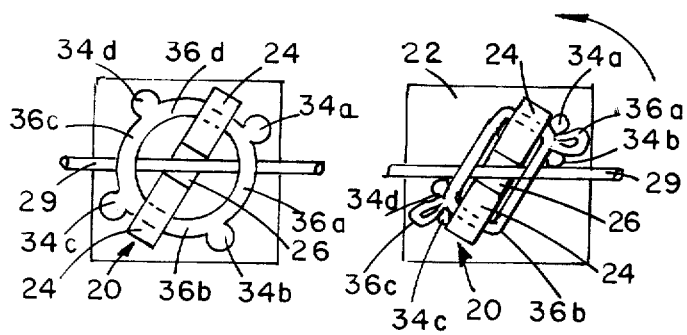

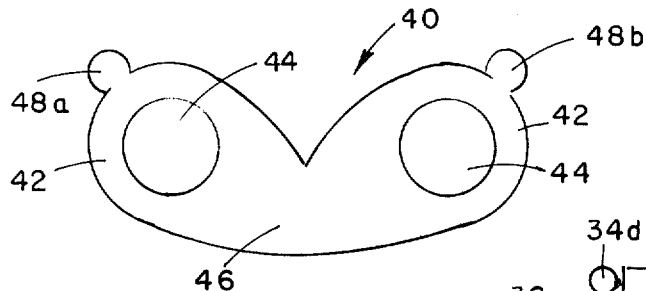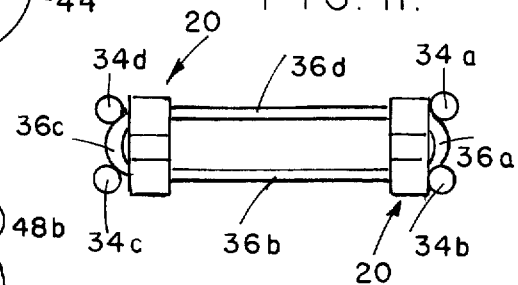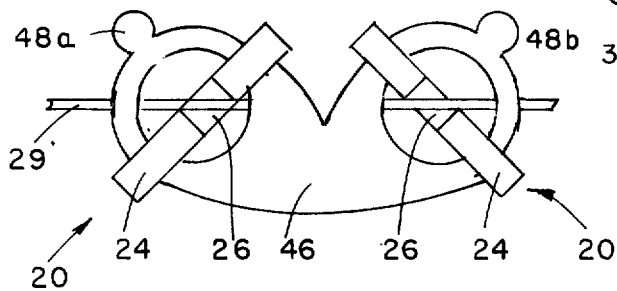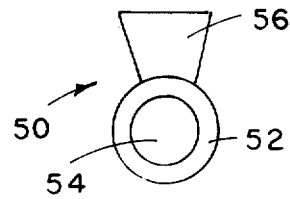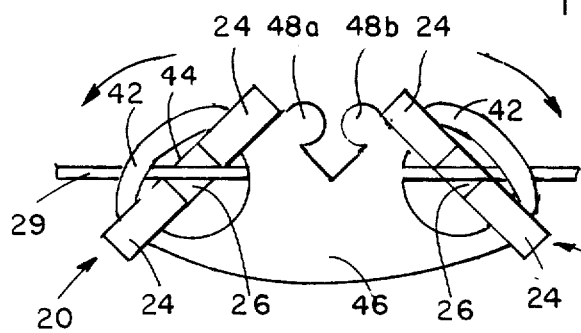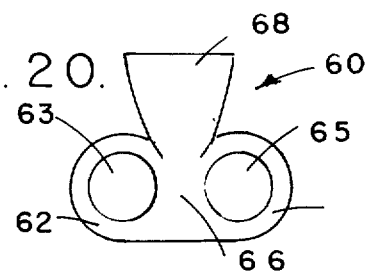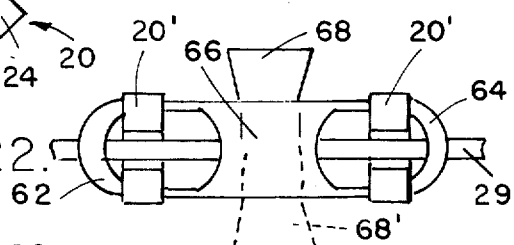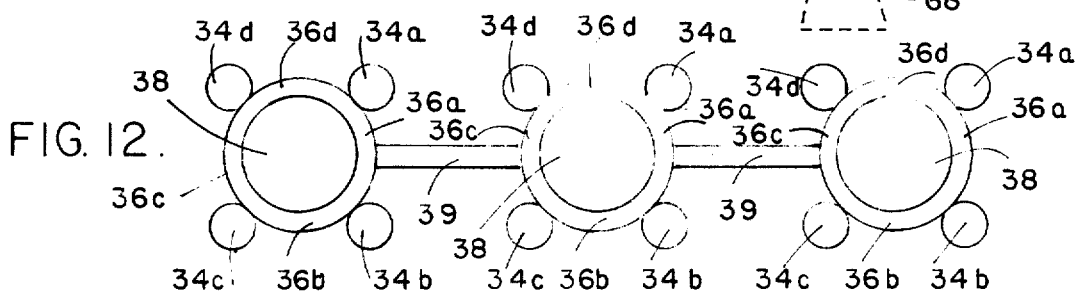

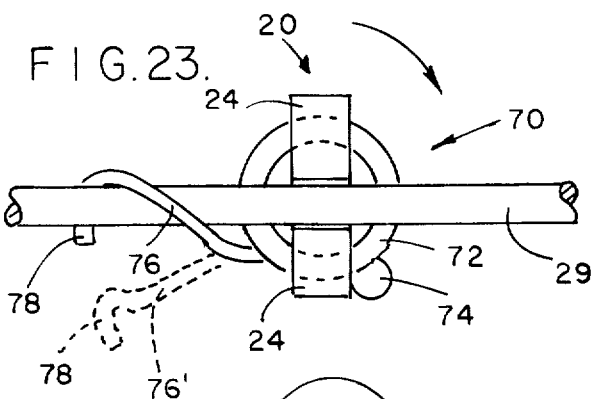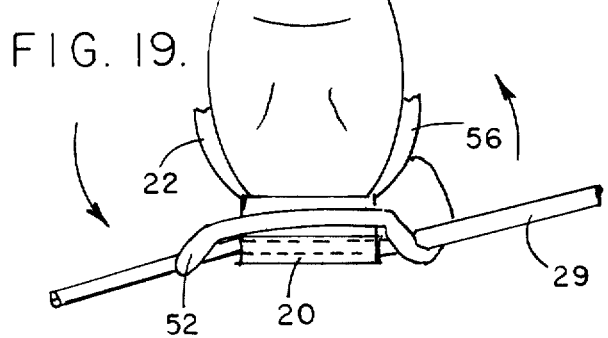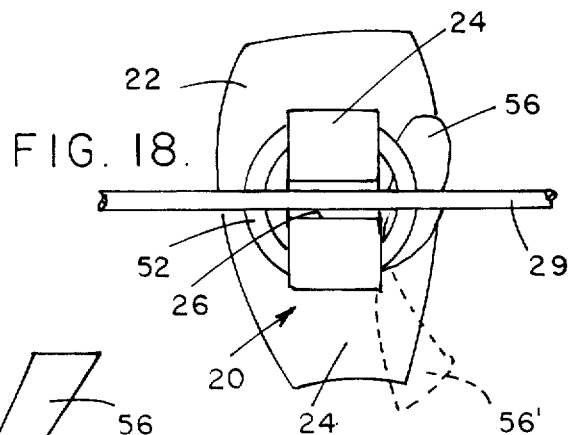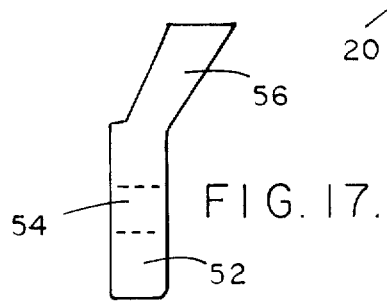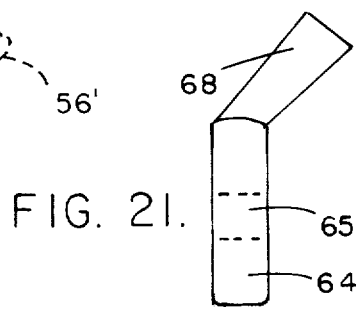

ORTHODONTIC ELASTIC APPLIANCE

BACKGROUND OF THE INVENTION

The present invention generally relates to orthodontic appliances, and particularly to an elastic appliance for cooperating with a channel on an orthodontic bracket for transmitting forces to the bracket when the elastic appliance is deformed while a protuberance, typically in the form of a nodule, abuts against the bracket in pressure-transmitting relationship.

Various orthodontic appliances are already known which cooperate with brackets and arch wires commonly used in orthodontics for biassing the brackets and thereby the teeth on which they are mounted in a desired manner. However, the known devices are frequently complex in construction and are time consuming to mount in an orthodontic arch system in the mouth.

Furthermore, many of the prior art devices utilized for biassing teeth are bulky and cause discomfort to the patient. Some other devices, particularly those made from metallic materials, sometimes from sharp edges or points which may impinge on the sensitive tissues of the mouth.

SUMMARY OF THE INVENTION

Accordingly, it is an object of the present invention to provide an orthodintic elastic appliance which does not possess the disadvantages of similar appliances known in the prior art.

It is another object of the present invention to provide an elastic appliance of the type above described which is simple in construction and economical to manufacture.

It is still another object of the present invention to provide an appliance of the type under discussion which is easily and quickly mounted on orthodontic brackets.

It is yet another object of the present invention to provide an elastic appliance which is not bulky and which does not cause discomfort to the patient when mounted in the mouth.

It is a further object of the present invention to provide an elastic appliance primarily to be utilized in orthodontics which is made from an elastomeric material and which may be easily manipulated to produce desired biassing forces on the brackets and, thereby, on the teeth, as they are being aligned by an orthodontic arch wire.

It is an additional object of the present invention to provide an elastic appliance which does not, when mounted in the mouth, damage sensitive tissues therein.

In order to achieve the above objects, as well as others which will become apparent hereafter, the present invention is for an elastic orthodontic appliance to be used with an orthodontic bracket which includes at least one channel. The appliance comprises elastic means dimensioned so as to be adapted to pass through one or more channels of a bracket. Protuberance means is provided which projects from the elastic means and has external dimensions greater than those of the elastic means and so selected so that said protuberance means cannot pass through the channel. In this manner, a force applied to said elastic means to stretch the same on one side of the channel with said protuberance means abutting against the bracket on the other side of the channel is transmitted by said protuberance means to the bracket.

In accordance with the one presently preferred embodiment, said elastic means comprises an elongated elastic strand and said protuberance means comprises a plurality of nodules distributed along the length of the elastic strand.

According to another embodiment, the elastic means comprises a closed loop of elastic material at least a portion of which is adapted to pass through the channel and be mounted on the bracket. Said protuberance means, in this instance, comprises at least two nodules distributed about the periphery of the closed loop. According to a variation of this embodiment, a plurality of nodules are distributed about the closed loop. Advantageously, said nodules are equally spaced from each other about said closed loop.

According to still another embodiment of the present invention, said elastic means comprises a plurality of adjacent closed loops serially spaced from each other, and connecting means between adjacent loops for connecting the latter together. Each of said loops is adapted to pass through a channel of the bracket and be securely mounted on the bracket. In connection with the last described embodiment, said protuberance means comprises a plurality of nodules distributed about each of said closed loops.

According to yet a further embodiment of the invention, the elastic means comprises two closed loops each adapted to pass through and be mounted on another of two spaced brackets. Said loops are connected to each other at one of their respective peripheral portions. Here, said protuberance means comprises one nodule on each loop in the region of each respective peripheral portion. Advantageously, said loops merge or are integral with each other in the regions of at least said one peripheral portions.

The protuberance means described in connection with the above embodiments may be made either from elastic material, and thereby integral with the elastic means, or can be made from any inelastic material, in which instance it is connected to the elastic means in any conventional manner.

Said protuberance means may also comprise resilient wedging means extending from a peripheral portion of a closed elastic loop. According to a variation of the latter embodiment, said elastic means may comprise two closed loops at least a portion of each of which is adapted to pass through a channel and be mounted on another one of two spaced brackets. Connecting means extending between said two loops connects one loop to the other. Here, said protuberance means comprises resilient wedging means extending from said connecting means.

An additional presently preferred embodiment is one wherein said elastic means comprises a closed loop of elastic material at least a portion of which is adapted to pass through the channel and be securely mounted on a bracket. Here, said protuberance means comprise a nodule positioned along the periphery of said loop, and an elongated projection projecting from said loop and having a hook at a free end thereof. Said projection is spaced from said nodule along said periphery and is adapted to engage an arch wire with said hook when the loop is mounted on the bracket. When so engaging the arch wire, the nodule abuts against the bracket in pressure transmitting relationship.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 1 is a front elevational view of one embodiment of an elastic appliance in accordance with the present invention;

FIG. 2 is a front elevational view of two adjacent brackets representing relative positions of teeth on which the brackets are mounted, showing the elastic appliance of FIG. 1 cooperating with the brackets;

FIG. 3 is an enlarged cross-section of the arrangement of FIG. 2 taken along line 3—3;

FIG. 4 is similar to FIG. 2, but showing another mode in which the elastic appliance of FIG. 1 may be utilized;

FIG. 5 is a front elevational view of another embodiment of an elastic appliance in accordance with the present invention, showing two bracket-engaging nodules;

FIG. 6 is a front elevational view of a bracket and an arch wire cooperating therewith, and showing the elastic appliance of FIG. 5 mounted on the bracket, shown prior to being set in its active biassing mode;

FIG. 7 is the same as FIG. 6, but showing the nodules of FIG. 6 shifted relative to one another by the elastic formation of the elastic appliance, whereby the appliance is brought to its active biassing mode;

FIG. 8 is similar to FIG. 5, but shows four nodules equally distributed about the periphery of the appliance;

FIG. 9 is similar to FIG. 6, wherein the appliance of FIG. 8 is in its inactive mode;

FIG. 10 is similar to FIG. 9 wherein the originally equally distributed nodules are shifted relative to one another so as to bring the elastic appliance into its active biassing mode;

FIG. 11 shows the two brackets of FIG. 4 and the elastic appliance of FIG. 8 mounted on the two brackets;

FIG. 12 is a front elevational view of a plurality of series-connected elastic appliances similar to that shown in FIG. 8;

FIG. 13 is still another embodiment of the elastic appliance in accordance with the present invention;

FIG. 14 is similar to FIG. 13, but showing the elastic appliance mounted on two adjacent brackets in its inactive mode prior to deformation;

FIG. 15 is similar to FIG. 14, but wherein the nodules on the periphery of the elastic appliance are shifted relative to one another to thereby bring the appliance to its biassing mode;

FIG. 16 is a front elevational view of yet another embodiment of the present invention;

FIG. 17 is a side elevational view of the embodiment of FIG. 16;

FIG. 18 is a front elevational view of a bracket mounted on a band and showing the embodiment of FIGS. 16, 17 cooperating with the brackets as well as an arch wire passing through the front or arch wire channel thereof;

FIG. 19 is a top plan view of the bracket and elastic appliance of FIG. 18;

FIG. 20 is a front elevational view of another embodiment of the present invention of the elastic appliance;

FIG. 21 is a side elevational view of the embodiment of FIG. 20;

FIG. 22 is a front elevational view of a double bracket and an arch wire passing through the channel of the latter and showing the embodiment of FIG. 20 cooperating with the bracket; and FIG. 23 is yet an additional embodiment of the present invention, showing an elastic appliance in its active biassing position wherein a nodule abuts against a bracket and a hook-shaped member extends from the appliance and engages an arch wire which passes through the bracket.

DETAILED DESCRIPTION OF THE PREFERRED EMBODIMENTS

Referring to FIG. 1, an elastic appliance 10 in accordance with the present invention is in the form of an elongated elastic strand 12, shown to comprise of spaced strand portions 12'. Mounted on or integral with the strand 12 are a plurality of spaced nodules 14 which define the lengths of the individual strand portions 12'.

In order to use the elastic appliance 10, in a manner to be described, the strand portions 12' are made from the elastic material. In accordance with a presently preferred embodiment, the nodules 14 are integral with the strand 12 and both are made from an elastomeric material, e.g., rubber or plastic. However, the nodules 14 need not be made from an elastic material. For reasons which will become apparent hereinafter, the nodules 14 can be made from any material whatsoever as long as the material has a minimum body or hardness. Also, the nodules 14 are shown in FIG. 1 to be spherical in shape. This is not a critical feature of the present invention and the nodules 14 in FIG. 1, as well as the other protuberances in the further embodiments to be described, may take any shape, e.g., cubical, as long as the external dimensions of the nodules are not smaller than the minimum dimensions required, as to be further described below.

Referring to FIGS. 2 and 3, the elastic appliance 10 of FIG. 1 is shown in a biassing mode mounted in the mouth of the patient. In these FIGURES, brackets 20 are shown mounted on bands 22 in a conventional manner. The brackets 20 shown are commonly designated as edgewise brackets. However, for reasons which will become apparent, any brackets which include at least one channel may equally be utilized with any of the elastic appliances in accordance with the present invention. Thus, the appliances may equally be used with the so-called Begg-type bracket.

Referring to FIGS. 2 and 3, the edgewise bracket of FIG. 2 is shown to have upper and lower wings 24 which together define an arch wire receiving channel 26 which is facially directed when mounted in a patient's mouth. The upper wing 24 defines, together with the band 22, an upper tie wire receiving channel 28a, while the lower wing 24 defines with the band 22 a lower tie wire receiving channel 28b. The channels 28a, 28b are conventionally utilized for the engagement of tie wires which secure the arch wire in the channel 26, as is well known to those skilled in the art.

At least one strand portion 12' is stretched so as to separate two or more nodules 14 from their normal positions of FIG. 1, wherein the strand portions 12' are not under stress. Once so stretched, a strand portion under stress is positioned in one of the channels of the bracket 20, here in the upper tie wire receiving channel 28a, and then released so as to permit the strand 12 to contract towards its untensioned or unstressed condition. Such contraction takes place to the extent permitted by the nodules 14 which, while returning to the initial relative spacings of FIG. 1, engage respective wings as well as bands. It should be noted that at this time, the strand 12 is still under a state of tension, but, because of the engagement of the nodules with the brackets, this tension is transmitted to the bracket 20.

To transmit forces via the nodules 14, it is clear that the external dimensions of the strand 12 or the individual strand portions 12' must be small enough so as to be capable of entering one of the aforementioned channels, i.e., channels 26, 28 a or 28b. However, the external dimensions of the nodules 14 must be sufficiently large so as not to be capable of passing through the selected channel of the bracket when the strand is under a state of tension. In FIGS. 2 and 3, the external dimensions of the strands 12' must be made smaller than the dimensions of the channels 28a, while the external dimensions of the nodules 14 must be greater than the same.

When the elastic appliance 10 is mounted on two adjacent brackets 20, as shown in FIG. 2, the biassing forces which are applied to the brackets, and thereby to the teeth on which the brackets are mounted, are generally in directions shown by the arrows in FIG. 2, i.e., the forces tend to move the two brackets towards one another. Thus, the left bracket of FIG. 2 will tend to move towards the right while the right bracket will tend to move towards the left. It should be clear, that the use of the elastic appliance 10, in cooperation with the tie-wire receiving channels, as described above, does not preclude the utilization of an arch wire which can still extend through the channel 26.

It should be clear, that the appliance 10 may be made as long or as short as desired — including as few or as many nodules 14 as necessary. The spacing between the nodules is not critical. It is advantageous to provide strands 10 having nodules 14 spaced different predetermined amounts so as to make use of the appliance especially flixible. Alternately, it is possible to provide the nodules closely spaced together some of which may be removed by clipping with pliers or other tools when not desired.

It should be clear, that it is not necessary to apply tension between every two adjacent brackets. In fact, it is possible to span several brackets without engaging the same. To do this, some nodules may be removed so as not to engage the intermediate brackets. In this manner, tension may be provided between two remote teeth for the purpose of pulling those teeth towards each other. The magnitude of the biassing forces can be adjusted by mounting the appliance 10 under a state of more or less tension. The tension can be controlled by controlling the extent to which the strand 12 is stretched prior to engagement with the brackets.

In FIG. 4, an alternate arrangement for mounting the elastic appliance 10 on two adjacent brackets is shown. Here, the two nodules 14 engage the brackets 20 on the sides of the brackets which face each other with an intermediate strand portion 12' passing through the upper tie-wire channels 28a and subsequently extending through the lower tie-wire receiving channels 28b. This configuration may be utilized to increase the tension between two adjacent brackets 20 when the brackets are spaced a distance approximating the length of the strand portion 12'.

In FIG. 5, another embodiment 30 of the elastic appliance is shown which comprises a loop 32 of elastic material which generally includes loop portions 36a and 36b. Protuberances in the form of nodules 34a, 34b are positioned at respective opposite peripheral ends of the loop portions 36a, 36b. As with the nodules 14 of FIG. 1, the nodules 34a, 34b are advantageously elastic and integral with the loop 32 although they may be made from another material and be connected to the loop 32 in any conventional manner. In FIG. 6, the elastic appliance 30 is shown mounted on a bracket 20 which in turn is mounted on a band 22. An arch wire 29 passes through the channel 26 of the bracket 20 in a conventional manner. The elastic appliance 20 is in its unstressed condition in FIG. 6, wherein the nodules 34a, 34b are not engaged with the bracket 20 while the loop portions 36a, 36b respectively pass through the upper channel 28a and lower channel 28b. The loop 32 can be snapped onto the bracket 20 and be mounted thereon by forcing the loop portions 36a, 36b over the bracket wings into the channels 28a, 28b. In this sense, the loop 32 can replace the conventional tie-wire and retain the arch wire 29 inside the channel 26.

The manner in which the elastic appliance 30 is placed into its active biassing mode is illustrated in FIG. 7. Firstly, the loop 32 is turned in a counterclockwise direction, as viewed in FIG. 7, until the nodule 34b engages the arch wire 29. The external dimensions of the nodules must be sufficiently large so as to be incapable of passing through a space formed by a wing of the bracket and the band 22. The nodule 34a is then moved in a substantially counterclockwise direction over the arch wire 29 and behind the bottom wing of the bracket 20 as shown in FIG. 7. During such movement of the nodule 34a, the elastic loop portion 36a is stretched. More particularly, the loop portion 36a is placed under substantial tension. The nodule 34a is thereby placed into abutting engagement against the bracket 20. To best understand the biassing action of the elastic appliance 30, it should be made clear that an arch wire generally acts as a fixed reference point which does not substantially change in position under the action of external forces. The tendency of the stretched loop portion 36a is to move the nodule 34 b in a generally counterclockwise direction and move the nodule 34a in a substantially clockwise direction, as viewed in FIG. 7. Since the nodule 34b cannot move in a counterclockwise direction as a result of the substantially fixed position of the arch wire 29, the stresses in the loop portion 36a are such as to urge the nodule 34a to move in a substantially clockwise direction. These biassing forces are transmitted directly to the bracket 20 with a consequent tendency of the bracket to move in a clockwise direction, as indicated by the arrow. The loop portion 36b, in the active biassing mode of the loop 32, is deformed into a loop-type configuration as shown in FIG. 7.

With respect to the embodiment of FIGS. 5 -7, it should be clear that forces may be applied to the bracket 20 which cause it to turn in either clockwise or counterclockwise direction depending on the manner in which one nodule engages the arch wire and the manner in which the other nodule engages the bracket. Thus, in order to impart a counterclockwise movement to the bracket 20, it is possible to position the nodule 34b and the nodule 34a on the upper right side of the arch wire and brackets respectively as viewed in FIG. 7. In this case, the nodule 34b would abut against the upper right side of the bracket while the nodule 34a would abut against the upper side of the arch wire. Other possible variations are also possible.

With respect to the above described embodiment 30 of the elastic appliance, and particularly referring to FIG. 7, it is clear that the loop portion 36b, or the unstressed loop portion, serves no function in the stressed state of the loop 32 shown in FIG. 7. In order to more evenly distribute the biassing forces, still another embodiment of the elastic appliance 30' may be utilized, as shown in FIG. 8, wherein four nodules 34a–34d are distributed about the periphery of a loop similar to that of the appliance 30. The appliance 30' is shown in its unstressed state in FIG. 9, wherein the nodules 34a–34d neither engage the bracket 20 nor the arch wire 29. In the unstressed condition, consequently, the loop portions 36a, 36d are not placed under any stress. In FIG. 10 the active biassing mode of the appliance 30' is shown. In order to achieve the biassing mode, the nodule 34b has been brought over to the upper side of the arch wire 29 while the nodule 34d of FIG. 9 has been brought over below the arch wire 29 on the other side of the bracket 22. During this movement of the nodules, the loop portion 36d is stretched as is the loop portion 36b – the two loop portions being placed under tension as in the case of the loop portion 36a of FIG. 7. Simultaneously, the loop portions 36a and 36c are deformed and warped as is loop portion 36b of FIG. 7. For reasons similar to those described in connection with FIG. 7, the bracket 20 will tend to turn in a generally counterclockwise direction as viewed in FIG. 10. This results from the fact that the nodules 34b and 34d abut against the arch wire 29 and are thereby fixed in position. Since the loop portions 36b and 36d are under tension, the loop portion 36d tends to move the nodule 34c in a counterclockwise direction while the loop portion 36d tends to move the nodule 34a in a counterclockwise direction. Both nodules 34a and 34c, abutting against opposite sides of the bracket 20, transmit the forces to the bracket which the respective stretched loop portions exert on the nodules.

The appliance 30' of FIG. 8 serves to upright the tooth on which the band 22 of FIG. 10 is mounted. However, the same appliance may be utilized to bring two adjacent teeth together, as with the appliance 10 of FIG. 1. In this case, the loop is elastically deformed as shown in FIG. 11 so that, for example, the loop portions 36b and 36d are placed under tension. With this arrangement, the portions 36a and 36c would normally tend to stretch so as to equalize the tension throughout the loop. However, the nodules 34a–34d respectively engage opposing sides of the two brackets 20 so that the tension is primarily formed in the loop portions 36b and 36d. In this manner, the tension forces can be somewhat regulated by controlling the position of the nodules 34a–34d in relation to the brackets.

The appliance 30' of FIG. 8 as well as the appliances 30 of FIG. 5, can be manufactured in strip form as shown in FIG. 12. Here, a plurality of similar appliances 30' are connected to each other by connecting portions 39. The diameter of the openings 38 are so selected so that each loop can snap over a respective bracket as shown in FIG. 9. When a single loop is required to upright a tooth as shown in FIG. 10, the loop can be cut from the strip by cutting off a connecting portion.

A further embodiment of the present invention is shown in FIGS. 13–15 and designated by the reference numeral 40. The elastic appliance 40 comprises two loop sections 42 which are connected by an enlarged connecting portion 46 to form openings 44. The exact configuration of the connecting portion 46 is not critical. The connecting portion 46 is so arranged with respect to the two adjacent loop sections 42 so that the connecting portion at least partially extends from one peripheral portion of one loop section to the peripheral portion of the other loop section. Adjacent to each of the peripheral portions of the two respective loops from which the connecting portions extends, there is provided a nodule 48a on one loop and a nodule 48b on the other loop.

In FIG. 14, the appliance 40 is shown in its unstressed state mounted on two adjacent brackets 20. Each of the brackets extends through a respective opening 44 of the appliance 40 13 the nodules 48a, 48b not engaging the brackets at this time and the loop sections 42 not being under tension. The appliance 40 is brought to its active biassing mode in a manner illustrated in FIG. 15. The nodule 48a is urged substantially in a clockwise direction as viewed in FIG. 15 behind the upper wing of the bracket 20 and positioned opposite to its original side of the bracket 20 in such a manner as to abut the bracket 20. Similarly, the nodule 48b is urged from its initial position of FIG. 14 in a substantially counterclockwise direction behind the upper wing of the bracket 20 so as to abut the respective bracket 20 on the other side of its original position with respect to that bracket. As should be clear, the loop sections on which the nodules are positioned are thereby placed under tension — each of the loop sections tending to pull back the respective nodules to their initial positions of FIG. 14. The movement of the nodules 48a, 48b towards the positions of FIG. 15 also simultaneously compresses the upper part, as viewed in FIG. 15, of the connecting portion 46 while placing the lower part thereof under tension. The resulting elastic deformation of the connecting portion 46 as well as of the loop sections 42, tends to turn the left bracket 20, as viewed in FIG. 15, in substantially counterclockwise direction while tending to turn the right bracket 20 in a substantially clockwise direction. The primary function of the elastic appliance 40 is to upright two adjacent teeth.

The elastic appliance 50 of FIG. 16 substantially comprises an elastic loop 52 having an opening 54 as can best be seen by making reference to both FIGS. 16 and 17. An elastic projection 56 extends from one peripheral portion of the loop 52. FIGS. 18 and 19 illustrate the manner in which the appliance 50 is utilized. Thus, the loop 52 overlaps the arch wire 29 on both sides of the bracket 20. The projection 56, originally positioned as shown in outline by reference numeral 56', is flipped up behind the arch wire 29 and interposed between the arch wire 29 and the band 22 in a wedged condition. The dimensions of the loop 52 are so selected so that when a bracket is forced interiorly of the loop opening 54, the loop 52 is elastically stressed. As mentioned above, the arch wire 29 is substantially fixed in position irrespective of normally encountered external forces. With the enlarged projection interposed between the arch wire 19 and the band 22 (or a tooth), the stressed loop pulls the bracket and, therefore, the band 22 towards the arch wire 29 — this action further compressing the enlarged projection 56. In view of the latter condition, it will be best clear from FIG. 19 that the left portion of the loop 52, as viewed in FIG. 19, tends to pull the left portion of the bracket 20 in a facial or frontal direction. Simultaneously, the projection 56, seeking to expand from its compressed state, applies an inwardly or lingual force to the right side of the band 22. The net result of such biassing is to apply forces to the tooth 21 which tend to rotate the same about its long axis. Thus, the appliance 50 may be utilized as a rotating device.

An embodiment which is structurally similar to that of FIG. 16 is shown in FIG. 20 and is generally designated by the reference numeral 60. Here, two adjacent loop sections 62, 64 with respective openings 63, 65 are connected by a connecting portion 66. Preferably, the two loop sections are merged with each other at their peripheral portions and are integrally made. The projection 68, similar to projection 56 of FIG. 16, projects from one peripheral portion substantially symmetrically between the two loop sections 62, 64. The configuration of the projection 68 may also be seen in FIG. 21.

In order to obtain a torqueing action with the elastic appliance 60 of FIG. 20, the loops 62, 64 are deformed by stretching the same in directions away from one another and mounting the same on a double bracket as suggested in FIG. 22 while the projection 68 is downwardly directed as shown and designated by number 68'. Each of the loop sections 62, 64 engages another bracket 20 as does the stretched loop 52. As with the projection 56, the projection 68 can be flipped approximately 180° from its normal position at 68' shown in FIG. 22 behind the arch wire 29 so that the projection is interposed between the arch wire 29 and a tooth or a band in a compressed condition. The effect of interposing the compressed projection 68 between a substantially fixed arch wire and a tooth cause a biassing force to be generated which tends to push the tooth inwardly or lingually away from the fixed arch wire 29. Such biassing forces tend to torque the tooth.

A yet further embodiment of the elastic appliance is designated by reference numeral 70 in FIG. 23. The appliance 70 includes a loop 72 with a nodule 74 as heretofore discussed along its periphery. The dimensions of the loop are so selected so that the loop portions may pass through the upper and lower tie-wire receiving channels of the bracket 20. Spaced from the nodule 74 along the periphery of the loop 72 is an elongated member 76 with a hook-shaped portion 78 at the free end thereof.

In the unstressed condition of the appliance 70, the nodule 74 may be positioned, for example, as shown in FIG. 23 — namely on one side of the bracket 20 but without engaging the latter. The elongated member 76 is, in its straightened condition, positioned as designated by the reference numeral 76' with the hook 78 disengaged from the arch wire 29. To bring the appliance 70 to its active biassing condition, the elongated member 76 is moved in a clockwise direction as viewed in FIG. 23 in order to engage the hook 78 with the arch wire 29. Such action causes the loop 72 to turn in a clockwise direction. However, such turning is substantially prevented by the abutment of the nodule 74 against the bracket 20. Although there is some deformation of the loop 72, the major deformation takes place in the elongated member 76. As before, since the arch wire 29 is substantially fixed in its position, the member 76 seeks to return to its normal unstressed state. This could normally be achieved by the clockwise rotation of the loop 72. This tendency of the loop 72 to turn in a clockwise direction is transmitted to the bracket 20 by the abutting nodule 74. Reversing the positions of the nodule and the elongated member with respect to the bracket 20, could provide a similar but counterclockwise action. In each case, the function which the appliance 70 performs is that of uprighting a tooth.

As will be noted from the description of the above described embodiments, the elastic appliances are very simple in construction and can be manufactured economically. Further, because of the rounded elastic nature of the appliances, there is very little danger of damage to the sensitive tissues in the mouth.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention.

What is claimed is:

1. An orthodontic elastic appliance comprising a plurality of orthodontic brackets mountable on spaced teeth, each bracket having two opposing surfaces, and an open channel having predetermined cross-sectional dimensions at said surfaces extending between the latter; an elongate elastic strand adapted to be received within said channels; and a plurality of nodules substantially equally spaced along said strand, each nodule having transverse external dimensions greater than said predetermined dimensions of said channel so that said nodules cannot pass through said channel, whereby said strand can be stretched along its length to space two of said nodules a distance substantially corresponding to the distance between two spaced brackets to bridge the latter, with said strand disposed within the channels of the respective brackets, and each nodule being drawn by said strand into an abutting relationship against a surface of the corresponding bracket to thereby cause a force to be applied to said engaged brackets tending to draw the same towards each other.

2. An orthodontic elastic appliance comprising a plurality of orthodontic brackets mountable on spaced teeth, each bracket having two opposing surfaces, and an open channel having predetermined cross-sectional dimensions at said surfaces extending between the latter; an elongate elastic strand adapted to be received in said channels; and a series of substantially equally spaced nodules disposed along said strand, each nodule having transverse external dimensions greater than said predetermined dimensions of said channel so that said nodules cannot pass through said channel, whereby said strand can be stretched along its length to space two of said nodules a distance substantially corresponding to the distance between two spaced brackets and at least partially wrapped around the latter to bridge the respective brackets with said strand disposed within the channels of the same and each nodule being drawn by said strand into an abutting relationship against a surface of the corresponding bracket to thereby cause a force to be applied to said engaged brackets tending to draw the same towards each other.

3. Orthodontic elastic appliance for use with an orthodontic bracket including a channel, the appliance comprising a closed loop of elastic material at least a portion of which is adapted to pass through the channel and be mounted on the bracket; and at least two nodules distributed about said closed loop projecting from the latter and having external transverse dimensions greater than those of said loop so that said nodules cannot pass through the channel, whereby a force applied to said loop to stretch the same on one side of the channel with said nodules abutting against the bracket on the other side of the channel is transmitted by said nodules to the bracket.

4. Orthodontic elastic appliances as defined in claim 3, wherein a plurality of nodules are distributed about said closed loop.

5. Orthodontic elastic appliances as defined in claim 3, wherein said nodules are equally spaced from each other about said closed loop.

6. Orthodontic elastic appliances as defined in claim 3, wherein four nodules are equally distributed about said closed loop.

7. Orthodontic elastic appliance for use with an orthodontic bracket including a channel, the appliance comprising a plurality of closed loops spaced from each other substantially along a line; connecting means between said two adjacent loops for connecting the latter to each other, each of said loops being adapted to pass through a channel of a bracket and be mounted on the bracket; and protuberance means projecting from said loop and having transverse external dimensions greater than those of the latter so that said protuberance means cannot pass through the channel, whereby a force applied to said loop to stretch the same on one side of the channel with said protuberance means abutting against the bracket on the other side of the channel is transmitted by said protuberance means to the bracket.

8. Orthodontic elastic appliances as defined in claim 7, wherein said protuberance means comprises a plurality of nodules distributed about each of said closed loops.

9. Orthodontic elastic appliance for use with an orthodontic bracket including a channel, the appliance comprising two closed loops each adapted to pass through and be mounted on another of two spaced brackets, said loops being connected to each other at one of their peripheral portions to thereby limit the spacing between said loops; and one nodule on each loop in the region of the respective peripheral portions projecting from a respective loop and having transverse external dimensions greater than those of the latter so that said nodules cannot pass through the channel, whereby a force applied to said loops to stretch the same on one side of the channel with said nodules abutting against the bracket on the other side of the channel is transmitted by said nodules to the bracket.

10. Orthodontic elastic appliances as defined in claim 9, wherein said loop means merge in the regions of said at least one peripheral portions.

11. Orthodontic elastic appliance for use with an orthodontic bracket including a channel, the appliance comprising a closed loop at least a portion of which is adapted to pass through the channel; and wedging means extending from a peripheral portion of said closed loop and having transverse external dimensions greater than those of the latter so that said wedging means cannot pass through the channel, whereby a force applied to said closed loop to stretch the same on one side of the channel with said wedging means abutting against the bracket on the other side of the channel is transmitted by said wedging means to the bracket.

12. Orthodontic elastic appliance for use with an orthodontic bracket including a channel, the appliance comprising two closed loops at least a portion of each of which is adapted to pass through a channel and mounted on another one of two spaced brackets; connecting means extending between said two loops for connecting one loop to the other; and wedging means extending from said connecting means and having transverse external dimensions greater than those of the latter so that said wedging means cannot pass through the channel, whereby a force applied to said closed loops to stretch the same on one side of the channel with said wedging means abutting against the bracket on the other side of the channel is transmitted by said wedging means to the bracket.

13. Orthodontic elastic appliance for use with an orthodontic bracket including a channel, the appliance comprising a closed loop of elastic material at least a portion of which is adapted to pass through the channel and be mounted on the bracket; and a nodule positioned along the periphery of said loop and an elongated member projecting from the periphery of said loop and having a hook at a free end thereof, said member being spaced from said nodule along said periphery, and said hook being configurated so as to be engageable with an arch wire, said nodule having external dimensions greater than the transverse dimensions of said loop so that nodule cannot pass through the channel, whereby a force applied to said loop by engagement of said hook with an arch wire to stretch the same on one side of the channel with said nodule abutting against the bracket on the other side of the channel is transmitted by said protuberance means to the bracket.

* * * * *